United States Patent [19]

Green et al.

[11] 4,344,632

[45] Aug. 17, 1982

[54] FLUID PRESSURE SEALING RING FOR A VALVE

[75] Inventors: Norman F. Green, Warrington; Douglas W. Wilda, West Chester, both of Pa.

[73] Assignee: Honeywell Inc., Minneapolis, Minn.

[21] Appl. No.: 293,787

[22] Filed: Aug. 18, 1981

Related U.S. Application Data

[63] Continuation of Ser. No. 124,305, Feb. 25, 1980, abandoned.

[51] Int. Cl.³ .............................................. F16K 25/00
[52] U.S. Cl. ................................... 277/152; 251/173; 277/190; 277/236
[58] Field of Search ............... 277/152, 171, 172, 173, 277/190, 191, 205, 236; 251/172, 173, 305, 306

[56] References Cited

U.S. PATENT DOCUMENTS

| | | | |
|---|---|---|---|
| 2,968,501 | 1/1961 | Tisch | 277/177 |
| 3,207,524 | 9/1965 | Trbouich | 277/206 |
| 3,326,560 | 6/1967 | Trbouich | 277/152 |
| 3,337,223 | 8/1967 | Nusbaum | 277/190 |
| 3,347,555 | 10/1967 | Norton | 277/177 |
| 4,165,859 | 8/1979 | Maclulaitis | 251/306 |
| 4,175,754 | 11/1979 | Wilhelm | 277/236 |
| 4,193,606 | 3/1980 | Iverson | 277/236 |

*Primary Examiner*—Robert I. Smith
*Attorney, Agent, or Firm*—Laurence J. Marhoefer; Lockwood D. Burton; Mitchell J. Halista

[57] ABSTRACT

A butterfly valve having a valve body and a valve disc which is rotated to produce an engagement with a peripheral edge of the disc and an annular seat or wall defined by a portion of an internal fluid passage in the valve body uses a seal ring member mounted in an annular groove in the valve body adjacent to the annular seat. The seal ring member includes a pair of bowed seal rings arranged in a "V" within a triangular shaped annular recess in the wall of the fluid passage in the valve body. One side, i.e., an inner side, of each of the seal rings projects from the triangular recess to contact the edge of the valve disc to form a fluid-tight seal in response to fluid pressure acting on a convex face of a seal ring to flatten the seal ring. The other side of each of the seal rings contacts a respective corner of the recess with the convex faces of the seal rings facing each other. A preload member is located in the space between the convex faces of the seal rings to apply a pressure to the convex faces to induce a contact between the inner side of each of the seal rings and the peripheral edge of the valve disc.

10 Claims, 5 Drawing Figures

FLUID PRESSURE SEALING RING FOR A VALVE

This is a continuation of application Ser. No. 124,305 filed on Feb. 25, 1980 and now abandoned.

BACKGROUND OF THE INVENTION

1. Field Of The Invention

The present invention relates to valves. More specifically, the present invention relates to a valve seal ring for producing a bi-directional fluid-tight seal on a valve sealing member.

2. Description Of The Prior Art

Valves having a valve body and a valve sealing member rotatably mounted in a fluid passage therein are well-known in the art as shown in the case of a so-called butterfly valve in U.S. Pat. No. 2,987,072. The provision for a resilient seal or member positioned in an annular groove of the wall defining the internal fluid passage of the valve body and encircling the valve sealing member or disc to provide a seal forming element which is arranged to engage the circumferential periphery of the valve disc and create a seal against fluid flow when the valve disc is in its closed position is also shown in the aforesaid patent. Another example of a butterfly valve with such a fluid pressure sealing ring or resilient member is shown in U.S. Pat. No. 3,771,763. Such prior art valve sealing members have generally not been adaptable to the provision of a metal to metal seal which is essential in providing a so-called "Fire Safe" valve as discussed in the July 17, 1978 edition of the "Oil and Gas Journal" in an article entitled "Fire Safe Valve Specs Summarized" by James Azzinaro. Further, even when not used in such "Fire Safe" valves, those prior art sealing mechanisms have included an excessive amount of deflection of the resilient seal during the operation of the valve leading to premature and rapid wear of the sealing face of the resilient element which ultimately results in a fluid leak through the valve.

Accordingly, it would be desirable to provide a valve sealing structure which is adaptable for "Fire Safe" valve operation as well as other valve applications while minimizing the effects of wear on the valve seal to avoid premature deterioriation of the valve.

SUMMARY OF THE INVENTION

An object of the present invention is to provide an improved fluid sealing element for a valve.

Another object of the present invention is to provide an improved fluid seal element for a butterfly valve.

In accomplishing these and other objects, there has been provided, in accordance with the present invention, a valve seal element having a pair of curved seal rings arranged in a triangularly shaped annular groove within a valve body. The seal rings are in a side-by-side relationship with an outer side of each ring facing a respective inner corner of the triangularly shaped recess while an inner side of each of the rings projects through an exit slit from the recess to a position wherein it contacts an outer peripheral edge of a valve disc. The convex faces of the seal rings are spaced apart from each other while the concave faces are spaced from a respective adjacent wall of the groove.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 2:
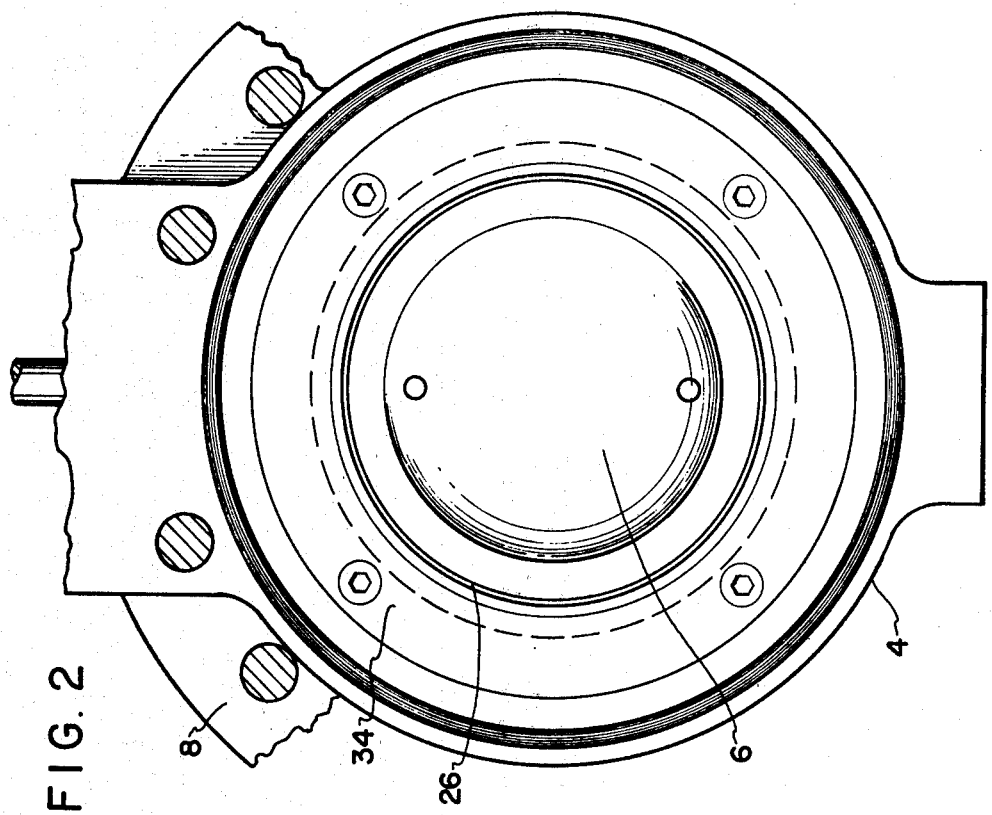
FIG. 2 is an end view of the butterfly valve of FIG. 1.
Figure 1:
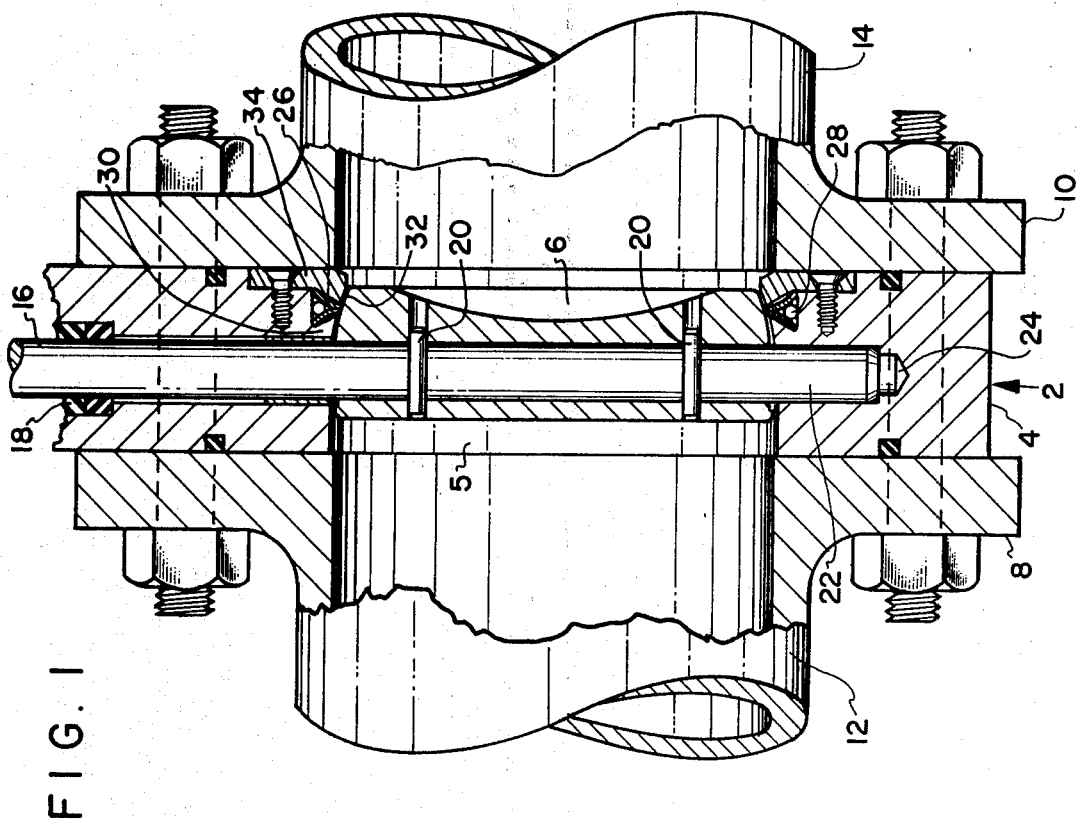
FIG. 1 is a partial cross-sectional side view of a butterfly valve using an embodiment of a valve seal of the present invention.
Figure 4:
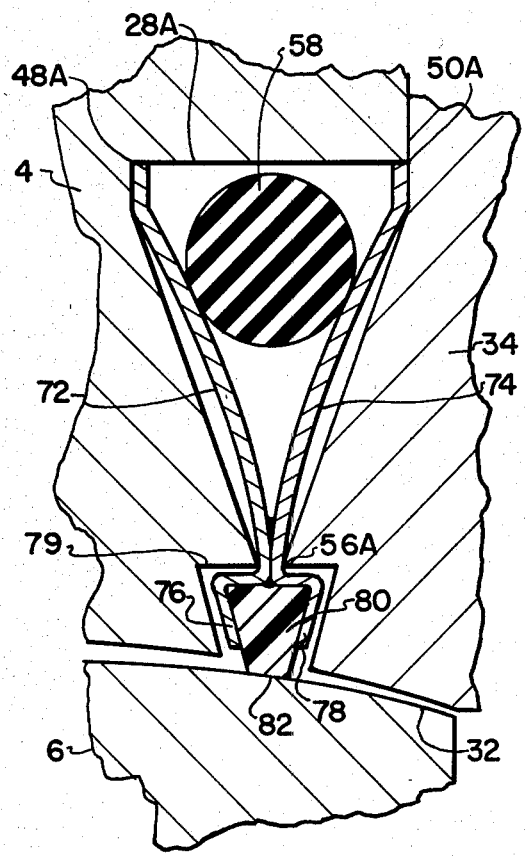
FIG. 4 is an enlarged cross-sectional view of a second example of a seal ring embodying the present invention and FIG. 5 is an enlarged cross-sectional view of a third example of a seal ring embodying the present invention.
Figure 5:
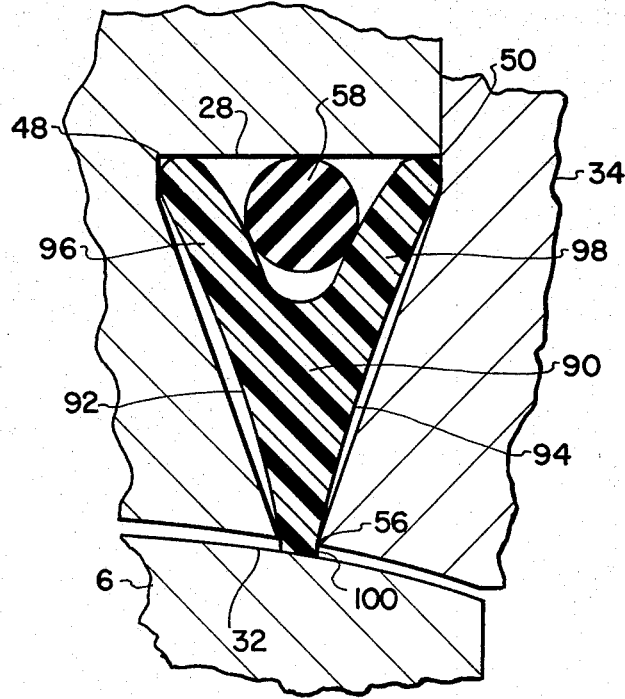

Referring to FIG. 1 in more detail, there is shown a partial cross-sectional side-view of a butterfly valve 2 having a valve body 4 and a valve disc 6 located within a central bore 5 of the valve body 4. The valve body 4 is arranged to be clamped between conventional end flanges 8, 10 used in connecting lengths of pipe 12, 14 to form a fluid flow line. The valve disc 6 is connected to a valve operating stem 16 passing through the cylindrical wall of the valve body 4. The stem 16 may be arranged to cooperate with packing rings 18 and a gland nut (not shown) to provide a fluid-tight seal for the stem 16. The valve disc 6 is connected to the stem 16 by means of any suitable connection means, e.g., pins 20, such connection means being well-known in the art. The lower end 22 of the stem 16 is supported on a pivot 24 extending into the wall portion of the valve body 4. Further description of the structure and operation of the butterfly valve 2 is believed to be unnecessary for a complete understanding of the present invention. An example of a seal ring 26 embodying the present invention is shown in an annular groove 28 within the wall 30 defining the central bore 5 of the valve body 4 and adjacent to the peripheral edge 32 of the valve disc 6. The groove 28 is defined by a slot in the wall 30 and a cover plate 34 to have a polygonal cross-section. An enlarged cross-sectional view of the recess, or groove, 28 housing the seal ring 26 is shown in FIGS. 3 to 5 with respective examples of seal rings embodying the present invention.

Figure 3:
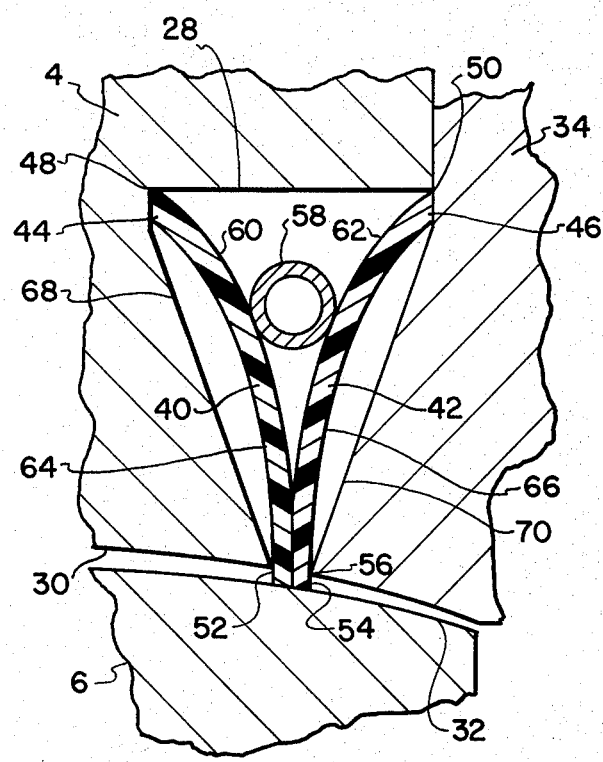
FIG. 3 is an enlarged cross-sectional view of a portion of the valve shown in FIG. 1 showing a first example of a seal ring embodying the present invention.

Referring now to FIG. 3, there is shown a magnified cross-sectional view of a portion of the valve body 4 showing the recess 28 with a triangular cross-section housing the valve seal of the present invention. The example shown in FIG. 3 has a pair of curved seal rings 40, 42 which are arranged to have the outer side 44, 46 of each of the rings 40, 42 abutting a respective inner corner 48, 50 of the triangularly shaped recess 28. The other, or inner, side 52, 54 of each of the rings 40, 42 is arranged to project from the recess 28 through an exit slit 56 to contact the peripheral edge 32 of the valve disc 6. The seal rings 40, 42 may be formed from a resilient material such as polytetrafluoroethylene. A seal preload element 58, which may be a garter spring or an "O" ring, is positioned in the space between convex faces 60, 62, of the two curved seal rings 40, 42 within the triangularly shaped recess 28. The preload element 58 contacts the convex face of each of the seal rings 40, 42 to apply a preload pressure thereto. The concave faces 64, 66 of each of the seal rings 40, 42 is arranged to be spaced from the adjacent respective sides 68, 70 of the triangular recess 28 and to contact the respective edges of the exit slit 56. The preload pressure is effective to straighten, or flatten, each of the curved seal rings 40, 42 to the extent that the inner sides 52, 54 are positioned to lightly contact the circumferential edge 32 of the valve disc 6.

In operation, during the closed state of the valve 2, a leakage of the fluid (not shown) being controlled by the valve 2 past the circumferential edge 32 of the disc 6, i.e., between the edge 32 of the disc 6 and the wall 30 defining the inner bore of the valve body 4, allows the pressurized fluid to enter a portion of the triangularly shaped recess 28 by means of the slit 56. Specifically, the presence of this pressurized fluid on the concave and convex side of one of the seal rings 40, 42 is ineffective to alter the curvature thereof against the action of the preload member 58. Conversely, the pressurized fluid acts only on the convex side of the other one of the seal rings 40, 42 to decrease the curvature thereof, i.e., flatten the seal ring, whereby to increase the effective width of the seal ring between the inner and outer sides thereof. This flattening of the seal ring is effective to force the inner side of the seal ring against the peripheral edge 32 of the valve disc 6 and the outer side of the seal ring into the corresponding corner of the triangularly shaped recess 28. For example, assume the fluid is flowing from left to right of the illustration in FIG. 3, the seal ring 40 is unaffected, and the seal ring 42 is flattened to force the outer side 46 into the corner 50 and the inner side 54 against the disc edge 32.

Thus, the disc seal for the pressurized fluid is formed between the inner side of the flattened seal ring and the peripheral edge 32 of the valve disc 6. For a fluid flow in the opposite direction, the other seal ring, i.e., seal ring 40, would be flattened to provide a fluid sealing action against the peripheral edge 32 of the valve disc 6. Thus, the sealing action is bidirectional with respect to fluid flow and is increased by the pressurized fluid in the sealed state of the valve disc 6. The preload member 58 is effective to provide a minimum sealing force of the inner sides 52, 54 with the peripheral edge 32 of the valve disc 6 which is not degraded by cold flow characteristics of polytetrafluorolene and is independent of the self-sealing action is effected by the pressurized fluid. This minimum force prevents excessive wear of the sealing edges 52, 54 of the seal rings 40, 42 while controlling the position of the seal rings 40, 42 within the recess 28.

In FIG. 4, there is shown a second example of an embodiment of the present invention wherein the seal rings are in the form of metallic rings 72, 74, e.g., spring steel, which are retained in the modified triangular recess 28A in the wall 30 of the valve body 4 and preloaded by the preload member 58. However, in this embodiment, the inner sides 76, 78 of the seal rings 72, 74 are not simply allowed to rest on the peripheral edge 32 of the valve disc 6 but are preformed to provide a recess or space 80 of the trapezoidal cross-section therebetween. Further, the faces of the seal rings 72, 74 adjacent to the formed ends 76, 78 are welded together to positively define the trapezoidal space 80 between the formed ends 76, 78. The exit slit 56A is modified to allow the welded faces of the seal rings 72, 74 to project therethrough while a secondary recess 79 is provided adjacent to the exit slit 56A to accommodate the formed ends of the seal rings 72, 74 whereby the inner sides of th seal rings 72, 74 are substantially housed within the recess 79. A resilient sealing ring 82 is located within the space 80 defined by the formed ends 76, 78 of the seal rings 72, 74 with an inner side of the sealing ring 82 projecting from the space 80, i.e., out of the recess 79, to contact the peripheral edge 32 of the valve disc 6. Thus, the projecting side of the sealing ring 82 which may be a resilient material such as polytetrafluoroethylene, is used to provide the fluid sealing action against the valve disc 6 during a normal operation of the valve 2.

The flexing of the curved metallic rings 72, 74 within the triangularly space shape 28 is effected by the pressurized fluid in a manner generally similar to that described above with respect to FIG. 3. However, in view of the welded portions of the sealing rings 72, 74 the pressure of the fluid is effective to force the resilient sealing ring against the valve disc 6 by tilting the formed ends 76, 78 of the seal rings 72, 74 rather than simply having one sealing ring slide past the other as in the case of the embodiment shown in FIG. 3. However, the motivation for this sealing action is still the flattening of one of the seal rings 72, 74 by the pressurized fluid. The example shown in FIG. 4, however, is arranged to provide a "Fire Safe" valve structure by having the ends 76, 78 of the seal rings 72, 74 produce a metal-to-metal seal on the peripheral rings 72, 74 produce a metal-to-metal seal on the peripheral edge 32 of the valve disc 6 following the destruction of the sealing ring 82 by excessively high temperatures applied to the valve 2. In this condition, the pressurized fluid is now effective to force the ends 76, 78 of the seal rings 72, 74 out of the recess 79 against the peripheral edge 32 of the valve disc 6 since the sealing ring 82 has been disintegrated by the excessive heat. Thus, the seal structure provides a fluid sealing action in the absence of the sealing member 82, and the sealing action is a metal-to-metal seal to provide the "Fire Safe " operation.

In FIG. 5, there is shown a third example of an embodiment of the present invention wherein the valve sealing means is in the form of a "Y" shaped solid member 90 having concave sides 92, 94 which may be of a resilient material as previously mentioned for the sealing rings shown in FIG. 3. The function of the preload member 58 located between the arms 96, 98 of the "Y" is similar to that described above with respect to FIGS. 3 and 4 while the pressurized fluid is effective to move the "Y" shaped sealing ring in a direction to flatten one of its convex sides 92, 94 against a respective adjacent wall 68, 70 of the triangularly shaped recess 28. This flattening action is effective to project the inner side 100 of the sealing member 90 out of the slit 56 to provide the increased fluid sealing operation against the peripheral edge 32 of the valve disc 6.

Accordingly, it may be seen that there has been provided, in accordance with the present invention an improved fluid sealing element for a valve which is shown in a butterfly valve structure.

The embodiments of the invention in which an exclusive property or privilege is claimed are defined as follows:

1. A fluid pressure seal comprising
   a first member having an annular recess of a polygonal cross-section therein with an exit slit,
   a sealing means disposed in said annular recess and having an outer side positioned in contact with an internal corner of said recess, an inner side extending out of said recess through said exit slit, and a concave face between said outer side and said inner side with said concave face being spaced from a respective side of said recess, and a second member having a fluid sealing peripheral edge in contact with said inner side of said sealing means when said second member is in a position to seal against a fluid exerting said fluid pressure, said fluid pressure acting on said sealing means to urge said concave face against said wall and said outer side into said corner to further extend said inner side of said sealing means out of said exit slit to increase the contact pressure of said inner side against said peripheral edge of said second member, said sealing means including a pair of bowed seal rings arranged with respective convex faces diverging from an area of contact at said inner side of said seal rings and respective concave faces spaced from respective walls of said recess.

2. A fluid pressure seal as set forth in claim 1 wherein said seal rings have inner sides arranged to grip a resilient sealing ring therebetween as an extension of said inner side.

3. A fluid pressure seal as set forth in claim 2 wherein said seal rings are made of spring steel.

4. A fluid pressure seal as set forth in claim 1 wherein said seal rings are made of polytetrafluoroethylene.

5. A fluid pressure seal as set forth in claim 1 and including a preload means arranged to contact said sealing means to induce a contact between said inner side and said peripheral edge of said second member independently of said fluid pressure.

6. A fluid pressure seal as set forth in claim 5 wherein said preload means is an "O" ring arranged to contact said convex faces.

7. A fluid pressure seal comprising a first member having an annular recess with at least one internal corner and an exit slit, a sealing means disposed in said annular recess and having an outer side positioned in contact with said corner of said recess and an inner side extending out of said recess through said exit slit, said sealing means including a bowed seal ring having a concave face between said outer side and said inner side with said concave face being spaced from an adjacent first internal side of said recess and a convex face with said convex face being spaced from an adjacent second internal side of said recess, said concave face and said convex face being located between said inner side and said outer side of said seal ring as opposite faces of said seal ring, and a second member having a fluid sealing peripheral edge in contact with said inner side of said sealing means extending from said exit slit when said second member is in a position to seal against a fluid exerting said fluid pressure, said fluid pressure acting on said convex face of said sealing means to urge said concave face against said adjacent first internal side of said recess and said outer side into said corner to further extend said sealing means out of said exit slit to increase the contact pressure of said sealing means against said peripheral edge of said second member.

8. A fluid sealing means as set forth in claim 7 wherein said sealing ring is made of polytetrafluoretylene.

9. A fluid sealing means as set forth in claim 7 and including a preload means arranged to contact said seal ring to induce said contact between said inner side of said seal ring and said peripheral edge of said second member independently of said fluid pressure.

10. A fluid sealing means as set forth in claim 9 wherein said preload means is an "O" ring in contact with said convex face of said seal ring.

* * * * *